United States Patent
Krammer et al.

(10) Patent No.: US 10,259,334 B2
(45) Date of Patent: Apr. 16, 2019

(54) MANUFACTURER-INDEPENDENT POSITIONING SYSTEM FOR AN INDUCTIVE CHARGING PROCESS

(71) Applicant: Bayerische Motoren Werke Aktiengesellschaft, Munich (DE)

(72) Inventors: Josef Krammer, Holzkirchen (DE); Torsten Herzog, Munich (DE); Stefan Drozkowski, Unterhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 60 days.

(21) Appl. No.: 15/273,735

(22) Filed: Sep. 23, 2016

(65) Prior Publication Data

US 2017/0008410 A1 Jan. 12, 2017

Related U.S. Application Data

(63) Continuation of application No. PCT/EP2015/051647, filed on Jan. 28, 2015.

(30) Foreign Application Priority Data

Mar. 26, 2014 (DE) .................. 10 2014 205 672

(51) Int. Cl.
*H02J 7/02* (2016.01)
*B60L 11/18* (2006.01)

(52) U.S. Cl.
CPC ....... *B60L 11/1831* (2013.01); *B60L 11/1829* (2013.01); *B60L 11/1833* (2013.01);
(Continued)

(58) Field of Classification Search
CPC .............. B60L 11/1831; B60L 11/1829; B60L 11/1833; B60L 2230/16; H02J 7/025;
(Continued)

(56) References Cited

U.S. PATENT DOCUMENTS

| 4,496,896 A * | 1/1985 | Melocik ............... B60K 1/04 320/108 |
| 2004/0000986 A1* | 1/2004 | Ott ..................... G01S 13/84 340/5.2 |

(Continued)

FOREIGN PATENT DOCUMENTS

| EP | 2 348 600 A2 | 7/2011 |
| JP | 2010-112782 A | 5/2010 |

(Continued)

OTHER PUBLICATIONS

Wikipedia, Radio-frequency identification, Feb. 8, 2014, https://web.archive.org/web/20140208233115/https://en.wikipedia.org/wiki/Radio-frequency_identification. (Year: 2014).*

(Continued)

*Primary Examiner* — Aaron L Troost
(74) *Attorney, Agent, or Firm* — Crowell & Moring LLP

(57) ABSTRACT

A method and a corresponding device are provided for positioning a vehicle over the base unit of an inductive charging system. In particular, a charging station for wirelessly transmitting electric energy to a vehicle includes a base unit which is designed to generate an electromagnetic charging field for transmitting electric energy to the vehicle. The charging station has a receiving unit which is designed to receive a request signal from a transmitting unit of a vehicle. The request signal lies in any of a plurality of different frequency ranges. The receiving unit is further designed to determine a signal strength of the received request signal.

12 Claims, 5 Drawing Sheets

(52) U.S. Cl.
CPC ............ *H02J 7/025* (2013.01); *B60L 2230/16* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01)

(58) Field of Classification Search
CPC ............ Y02T 10/7005; Y02T 10/7088; Y02T 90/121; Y02T 90/122; Y02T 90/125; Y02T 90/128; Y02T 90/14; Y02T 90/163
See application file for complete search history.

(56) References Cited

U.S. PATENT DOCUMENTS

| | | | |
|---|---|---|---|
| 2011/0175569 A1* | 7/2011 | Austin | B60L 11/1824 320/109 |
| 2012/0038220 A1 | 2/2012 | Kim et al. | |
| 2012/0153894 A1 | 6/2012 | Widmer | |
| 2012/0161696 A1* | 6/2012 | Cook | B60L 11/182 320/108 |
| 2012/0239571 A1* | 9/2012 | Boot | B60L 11/1816 705/44 |
| 2012/0262002 A1 | 10/2012 | Widmer et al. | |
| 2013/0035126 A1 | 2/2013 | Kim et al. | |
| 2013/0110318 A1* | 5/2013 | Colja | H02J 5/005 701/2 |
| 2014/0004792 A1* | 1/2014 | Heuer | H04B 7/24 455/39 |
| 2014/0015328 A1 | 1/2014 | Beaver et al. | |
| 2014/0035526 A1 | 2/2014 | Tripathi et al. | |
| 2014/0044293 A1* | 2/2014 | Ganem | H02J 7/025 381/323 |
| 2014/0197693 A1 | 7/2014 | Fujita et al. | |
| 2014/0217966 A1* | 8/2014 | Schneider | H02J 50/12 320/108 |
| 2015/0283909 A1* | 10/2015 | Ichikawa | H02J 17/00 307/10.1 |

FOREIGN PATENT DOCUMENTS

| | | |
|---|---|---|
| JP | 2010-243193 A | 10/2010 |
| WO | WO 2013/061612 A1 | 4/2015 |

OTHER PUBLICATIONS

International Search Report (PCT/ISA/210) issued in PCT Application No. PCT/EP2015/051647 dated May 20, 2015 with English translation (seven pages).

German-language Written Opinion (PCT/ISA/237) issued in PCT Application No. PCT/EP2015/051647 dated May 20, 2015 (nine pages).

German Search Report issued in counterpart German Application No. 10 2014 205 672.1 dated Nov. 27, 2014 with partial English translation (13 pages).

* cited by examiner

MANUFACTURER-INDEPENDENT POSITIONING SYSTEM FOR AN INDUCTIVE CHARGING PROCESS

CROSS REFERENCE TO RELATED APPLICATIONS

This application is a continuation of PCT International Application No. PCT/EP2015/051647, filed Jan. 28, 2015, which claims priority under 35 U.S.C. § 119 from German Patent Application No. 10 2014 205 672.1, filed Mar. 26, 2014, the entire disclosures of which are herein expressly incorporated by reference.

BACKGROUND AND SUMMARY OF THE INVENTION

The invention relates to a method and to a corresponding device for positioning a vehicle over the base unit of an inductive charging system.

Vehicles with an electric drive typically have a battery in which electrical energy for operating an electric machine of the vehicle can be stored. The battery of the vehicle can be charged with electrical energy from a power supply grid. For this purpose, the battery is coupled to the power supply grid in order to transmit the electrical energy from the power supply and into the battery of the vehicle. The coupling can be effected in a wire-bound fashion (via a charging cable) and/or in a wireless fashion (using an inductive coupling between a charging station and the vehicle).

An approach for automatic cableless inductive charging of the battery of the vehicle includes transmitting electrical energy to the battery from the floor to the underfloor of the vehicle by way of magnetic induction across the underfloor clearance 120. This is illustrated, for example, in FIG. 1. In particular, FIG. 1 shows a vehicle 100 with a storage unit 103 for electrical energy (e.g. with a chargeable battery 103). The vehicle 100 has what is referred to as a secondary coil in the underfloor of the vehicle, wherein the secondary coil is connected to the storage unit 103 via an impedance adaptor (not shown) and a rectifier 101. The secondary coil is typically part of what is referred to as a "wireless power transfer" (WPT) vehicle unit 102.

The secondary coil of the WPT vehicle unit 102 can be positioned above a primary coil, wherein the primary coil is mounted e.g. on the floor of a garage. The primary coil is typically part of what is referred to as a WPT base unit 111. The primary coil is connected to a power supply 110 (in this document also referred to as a charging unit 110). The power supply 110 can be a radiofrequency generator which generates an AC (Alternating Current) in the primary coil of the WPT base unit 111, as a result of which a magnetic field is induced. This magnetic field is also referred to in this document as an electromagnetic charging field. The electromagnetic charging field can have a predefined charging field frequency range. The charging field frequency range can be in the LF (Low Frequency) range, e.g. 80-90 kHz (in particular 85 kHz) or approximately 145 kHz.

Given sufficient magnetic coupling between the primary coil of the WPT base unit 111 and the secondary coil of the WPT vehicle unit 102 across the underfloor clearance 120, the magnetic field induces a corresponding voltage and therefore also a current in the secondary coil. The induced current in the secondary coil of the WPT vehicle unit 102 is rectified by the rectifier 101 and stored in the storage unit 103 (e.g. in the battery). It is therefore possible to transmit energy in a cableless fashion from the power supply 110 to the energy storage unit 103 of the vehicle 100. The charging process can be controlled in the vehicle 100 by way of a charging control unit 105 (also referred to as a WPT control unit 105). The charging control unit 105 can for this purpose be configured to communicate, e.g. in a wireless fashion, the charging unit 110 (e.g. with a wall box) or with the WPT base unit 111.

For an effective transfer of energy by means of the electromagnetic charging field it is typically necessary for the WPT vehicle unit 102 to be positioned relatively precisely over the WPT base unit 111. This positioning can be assisted by determining the position of the vehicle 100 relative to the WPT base unit 111.

The present document is therefore concerned with the technical task of determining, in an efficient and precise fashion, a position of the vehicle 100 relative to the WPT base unit 111 of an inductive charging system. The intention has been here to enable the determination of the position for vehicles 100 from a multiplicity of different manufacturers. In other words, the determination of the position should be independent of the manufacturer and/or applicable to all manufacturers.

According to one aspect of the invention, a charging station for wirelessly transmitting electrical energy to a vehicle (e.g. to a vehicle with an electric drive) is described. The vehicle may be, in particular, a land vehicle, e.g. a passenger car, a truck or a motorcycle. The charging station includes a base unit which is configured to generate an electromagnetic charging field for transmitting electrical energy to the vehicle. The base unit can include, in particular, a primary coil which is configured to generate the electromagnetic charging field.

The charging station also includes a receiver unit which is configured to receive a request signal from a transmitter unit of a vehicle. The request signal can comprise, in particular, a request signal of a keyless access function and/or of a keyless engine start function of a vehicle. The receiver unit can be arranged on or in the base unit. Alternatively or additionally, the receiver unit can be arranged on a charging unit (e.g. on a wall box) of the charging station.

The receiver unit can be configured in such a way that a request signal can be received from any of a plurality of different frequency ranges. In other words, the receiver unit can be configured to receive request signals which each lie in one of a plurality of different frequency ranges.

The receiver unit is also configured to detect a signal strength of the received request signal. The signal strength of the received request signal can be used to determine the position of the vehicle which has emitted the request signal, relative to the charging station and, in particular, relative to the base unit.

The fact that the receiver unit can receive request signals in a plurality of different frequency ranges permits vehicles from different manufacturers to be positioned. The plurality of different frequency ranges can include, for example, one or more of the following frequency ranges: a frequency range around 21 kHz; a frequency range around 80 kHz; a frequency range around 125 kHz; and/or a frequency range around 132 kHz. The individual frequency ranges of the request signals can be delimited substantially from one another. In other words, the frequency ranges of the request signals can be such that request signals do not substantially disrupt one another in different frequency ranges.

As stated above, the receiver unit can be arranged on or in the base unit. In particular, the receiver unit can be secured (in contrast to a key for an access function) at a fixed position and/or can have a fixed orientation in the space. The receiver unit can then be configured to evaluate the individual direction components of a reception field (e.g. an X component, Y component and Z component) individually for the sake of better resolution. As a result, the quality of the reception of the one or more request signals can be increased.

In order to detect the signal strength, the receiver unit can be configured to receive a signal (e.g. an analog electrical signal) which includes the request signal. The receiver unit can also be configured to detect the frequency range of the request signal as a frequency range from the plurality of different frequency ranges. For example, an information item of the frequency range of the request signal can be transmitted from the vehicle which has emitted the request signal to the charging station. Furthermore, the receiver unit can be configured to condition and/or process the received signal as a function of the detected frequency range of the request signal. In particular, a frequency component of the received signal which lies in the frequency range of the request signal can be isolated in order to detect the conditioned signal. The signal strength of the request signal can then be detected on the basis of the conditioned signal. As a result, precise detection of the signal strength of the request signal is made possible, which in turn permits precise determination of the position of the vehicle which has emitted the request signal.

The receiver unit can include a receiver unit which is configured to convert an electromagnetic field (which includes the request signal) into an analog electrical signal (e.g. into the received signal). Furthermore, the receiver unit can include a signal conditioning unit which is configured to damp the analog electrical signal in a charging field frequency range of the electromagnetic charging field relative to the analog electrical signal in one or more of the plurality of different frequency ranges. In other words, the signal conditioning unit can be configured to reduce the signal strength of that component of the received signal which is based on an electromagnetic charging field relative to other signal components. As a result, inaccuracies during the detection of the signal strength of the request signal, which originate from an electromagnetic charging field, can be reduced or avoided. Consequently, the accuracy of the determination of the position of the vehicle increases in this way.

As stated above, the receiver unit can be configured to detect the frequency range of the request signal from the plurality of different frequency ranges. Furthermore, the receiver unit can be configured to adapt the signal conditioning unit to the frequency range of the request signal. In particular, the signal conditioning unit can be adapted in such away that a component of the received signal which is based on the request signal is emphasized relative to other components.

Alternatively, the receiver unit can be configured to damp the analog electrical signal in the charging field frequency range relative to the analog electrical signal in all of the plurality of different frequency ranges, and to damp the analog electrical signal in the plurality of different frequency ranges with a predefined damping or less. In other words, the signal conditioning unit can be configured in a static fashion and can emphasize the signal components of all the possible frequency ranges of the plurality of different frequency ranges relative to the signal component in the charging field frequency range.

The receiver unit can also include an analog-to-digital converter which is configured to convert a signal derived from the analog electrical signal into a digital signal. Furthermore, the receiver unit can include a filter unit which is configured to raise the digital signal in one of the plurality of different frequency ranges relative to the digital signal into the other of the plurality of different frequency ranges. In particular, the component of the digital signal which lies in the frequency range of the request signal can be isolated and/or emphasized.

Furthermore, the receiver unit can include a detection unit which is configured to detect a signal strength of the signal at the output of the filter unit. The signal at the output of the filter unit can primarily include components of the received request signal. Consequently, the signal strength of the request signal can be determined in a precise fashion.

The filter unit can include a digital filter. The digital filter can be sequentially adapted to the plurality of different frequency ranges. It is therefore possible to detect in a sequential fashion whether and, if appropriate in which frequency range, a request signal is received. The charging station can therefore determine (without information from a vehicle) which frequency range the vehicle emits request signals in.

The request signal may have been transmitted by a transmitter unit of the vehicle to which electrical energy is to be transmitted via the base unit. The receiver unit can then be configured to make available the detected signal strength in order to detect a position of the vehicle relative to the base unit. In particular, the detected signal strength can be transmitted to the vehicle in order to permit the vehicle to carry out positioning above the base unit.

The charging station can also be configured to cause the base unit to reduce a field strength of the electromagnetic charging field if the reception of a request signal has been detected by means of the receiver unit. It is therefore possible to ensure that a positioning process and/or a keyless access function is not disrupted by an electromagnetic charging field.

According to a further aspect, a method for determining the position of a vehicle relative to a charging station is described. The method includes transmitting a request signal from the vehicle. In this context, the request signal can lie in any of a plurality of different frequency ranges. The method also includes receiving a signal at the charging station, wherein the received signal includes the request signal. The method also includes detecting the frequency range of the request signal at the charging station as a frequency range from the plurality of different frequency ranges. The received signal is then conditioned as a function of the detected frequency range of the request signal, and the signal strength of the request signal is detected on the basis of the conditioned signal. The position of the vehicle relative to the charging station can be determined on the basis of the detected signal strength.

According to a further aspect, a software (SW) program is described. The SW program can be configured to be run on a processor (e.g. on a control unit) and to thereby carry out the method described in this document.

According to a further aspect, a storage medium is described. The storage medium can store a SW program which is configured to be run on a processor and thereby to carry out the method described in this document.

It is to be noted that the methods, devices and systems described in this document can be used both alone and in combination with other methods, devices and systems described in this document. Furthermore, any aspects of the method, device and systems which are described in this document can be combined with one another in a variety of ways. In particular, the features of the claims can be combined with one another in a variety of ways.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
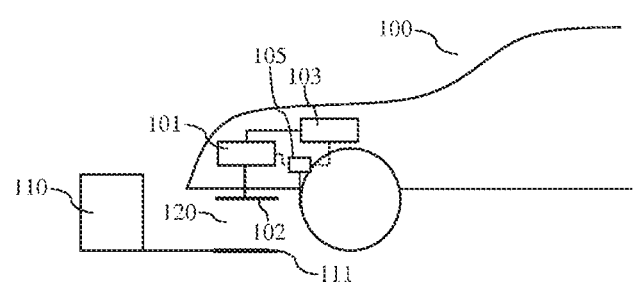
FIG. 1 is a schematic diagram of an exemplary device for inductively charging a vehicle.

As stated at the beginning, the present document is concerned with the determination of the position of a vehicle 100 relative to a WPT base unit 111. The intention has been to make the determination of the position possible for vehicles 100 of a plurality of different manufacturers, in order to make available charging units or charging stations 110 which are configured to charge inductively vehicles 100 of the plurality of different manufacturers.

Within the scope of making available a keyless access function, the measurement of the relative position between a vehicle 100 and a vehicle key is necessary. In this document it is proposed to adapt the method for determining the relative position between a vehicle 100 and a key for the determination of the relative position between a vehicle 100 and a WPT base unit 111. As a result, a cost effective and manufacturer independent determination of position is made possible.

Various vehicle manufacturers provide a keyless access function (also referred to as a "smart key") to a vehicle 100 (in the case of BMW e.g. by the name "comfort access", CA). The keyless access function permits a driver to open a vehicle door 210 or to start the engine of the vehicle 100 without using the key lock principle (see FIG. 2a). In order to open the door 210, the driver grips the door handle 211. A proximity sensor 212 on or in the vicinity of the door handle 211 senses, i.e. detects, this movement. A specific LF signal (low frequency signal) is consequently emitted via one or more transmitter units 201 of the vehicle 100. This signal can also be referred to as a request signal. In other words, the one or more transmitter units 201 can be configured to emit an electromagnetic field (in particular in the LF range), i.e. the request signal. Exemplary transmission frequencies of the one or more transmitter units 201 lie in the frequency range of 20-140 kHz (e.g. 20 kHz, 124 kHz, 125 kHz, 127 kHz, 133 kHz or 135 kHz), i.e. different vehicle manufacturers use different transmission frequencies for the request signal according to the circumstances.

The electromagnetic field which is emitted by the one or more transmitter units 201 includes the request signal. The emitted request signal can have a plurality of parts. A first part of the request signal can be configured to wake up a receiver unit 223 in a key 220 of the driver, i.e. to prepare it for the reception of further information (see FIG. 2b). A further part of the request signal can have information for identifying the vehicle 100. The various parts of the request signal which is emitted by one or more transmitter units 201 can be transmitted with offset timing.

The receiver unit 223 in the key 220 is configured to receive the signals or signal parts transmitted by the one or more transmitter units 201, and to detect the signal strength or field strength of the signals or signal parts. A key transmitter unit 221 of the key 200 responds to the received request signal with a response signal. The response signal is typically transmitted in a different (typically higher) frequency range than the request signal. For example, the response signal can be transmitted with a response frequency of 433 MHz (i.e. in the HF (high frequency) range).

The response signal can be composed of a plurality of parts. A first part of the response signal can serve to identify the key 220 and a further part of the response signal can be an indicator for the measured signal strength of the request signal. One or more receiver units 204 of the vehicle 100 can receive the response signal and/or the response signal parts and pass it/them onto a control unit 202 of the vehicle 100. The control unit 202 can be configured to check whether the key 220 matches the vehicle 100. Furthermore, by means of triangulation or by means of a lookup table the position of the key 220 relative to the vehicle 100 can be calculated (on the basis of the measured signal strengths of a plurality of request signals). If the estimated position of the key 220 matches the position of the proximity sensor 212 (e.g. surroundings of the door 220 which is touched and/or of the door handle 211 which is touched), the door 210 and/or the entire vehicle 100 is opened.

Figure 2A:
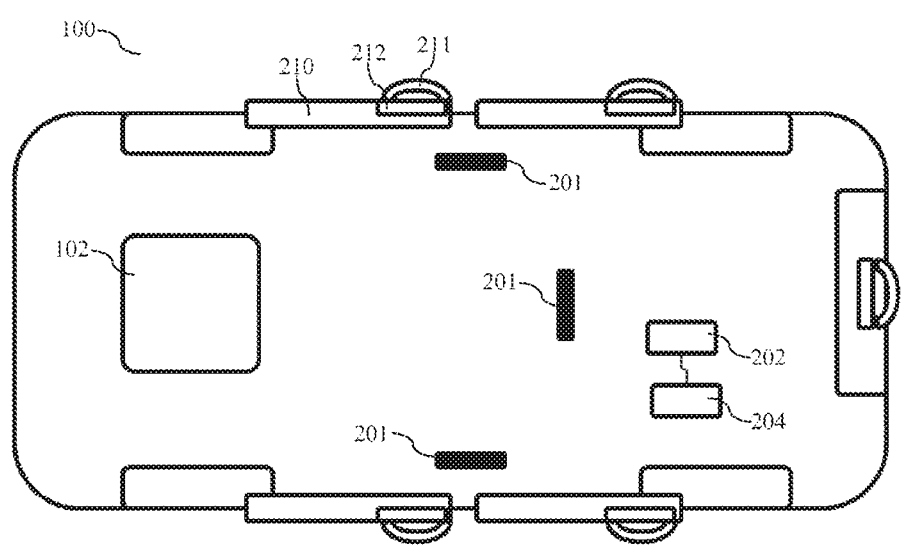
FIG. 2a is a schematic diagram of an exemplary vehicle with a secondary coil and one or more transmitter units for communicating with a vehicle key.
Figure 2B:
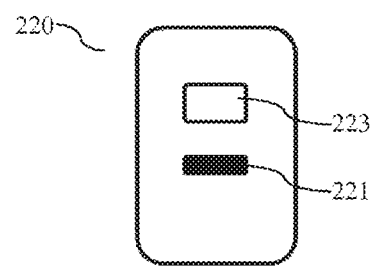
FIG. 2b is a schematic diagram of an exemplary vehicle key.

As is illustrated in FIG. 2a, the vehicle 100 typically includes a plurality of transmitter units 201. The transmitter units 201 can be arranged at different locations in the vehicle 100. Each transmitter unit 201 of the plurality of transmitter units 201 can transmit a request signal (e.g. a signal pulse). The request signals can be offset chronologically with respect to one another and, if appropriate, have a predefined sequence. Alternatively or additionally, the request signals can have a unique identifier. The key 220 and/or the receiver unit 204 of the vehicle 100 can uniquely assign the request signals in each case to a transmitter unit 201 of the plurality of transmitter units 201 by means of the identifier and/or by means of the sequence. In this way, the respective signal strength of the individual request signals and therefore also the respective distance between the transmitter unit 201 and the key 220 can be detected. Since the transmitter units 201 are located at different locations in the vehicle 100, a plurality of distances are obtained for the corresponding plurality of transmitter units 201. On the basis of triangulation methods it is therefore possible to determine the relative position of the vehicle 100 and key 220. If appropriate, an orientation of the vehicle 100 in respect of the key 220 can also be determined.

The abovementioned procedure for comparing the identity/position of the vehicle 100 and key 220 typically takes up a time period of approximately 100 ms. Owing to the short time period, the abovementioned procedure typically remains unnoticed by the driver, with the result that the driver can open the door 210 directly by gripping the door handle 211. An analogous procedure for comparing identity also typically takes place when the engine is started.

Figure 3:
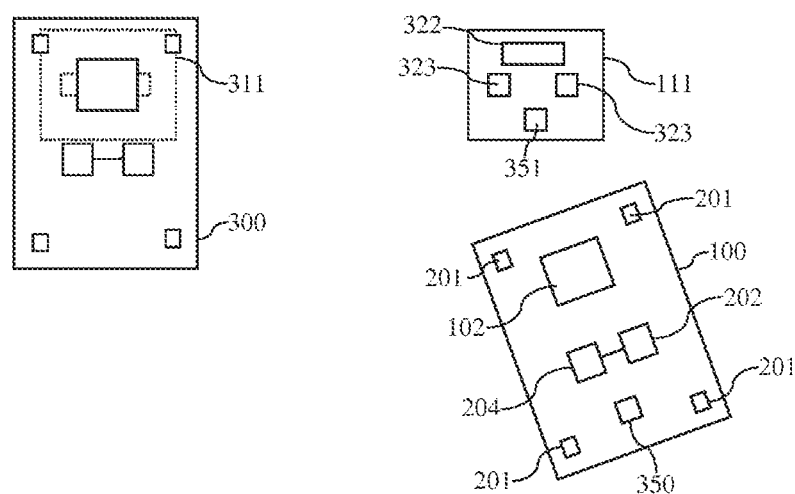
FIG. 3 is a schematic diagram of an exemplary base unit and an exemplary vehicle.

As stated above, the method for positioning a key 220 relative to the vehicle 100 can be adapted in an analogous fashion for the positioning of a vehicle 100 over a base unit 111. For this purpose, the base unit 111 can be provided with one or more receiver units 323 (analogously to the receiver unit 223 of a key 220) for the request signals of the transmitter units 201 of an approaching vehicle 100. This is illustrated in FIG. 3 (right hand side). In particular FIG. 3 shows a vehicle 100 which is approaching a base unit 111. The vehicle 100 is intended to be positioned in such a way that a distance which is as short as possible results between the base unit 111 and the vehicle unit 102.

The base unit 111 which is illustrated in FIG. 3 includes two receiver units 323 for request signals of the transmitter units 201 of the vehicle 100. The accuracy of the determination of the position of the vehicle 100 relative to the base unit 111 can be increased by using a plurality of receiver units 323 which are located at a corresponding plurality of different locations on the base unit 111. However, in principle a single receiver unit 323 is sufficient to determine the position and/or the rotation of the vehicle 100 relative to the base unit 111 (in particular if the vehicle 100 has a plurality of transmitter units 201). In an alternative example, the vehicle 100 can have a single transmitter unit 201. In this case, a plurality of signal strengths for determining the position can be detected by means of a plurality of receiver units 323.

The control unit 202 of the vehicle 100 can be configured to initiate the method for positioning the vehicle 100. In particular, the control unit 202 can cause request signals to be transmitted from the transmitter units 201 of the vehicle 100. For example, a driver of the vehicle 100 can cause the positioning process to be initiated (e.g. by pressing a push-button key in the vehicle 100 or by means of a menu selection). Alternatively or additionally, the vehicle 100 can include a communication unit 350 which is configured to communicate with a corresponding communication unit 351 of the base unit 111 or of the charging unit 110. The communication units 350, 351 can use a wireless communication method (e.g. WLAN or Bluetooth) for this purpose. The charging unit 110 can communicate with the vehicle 100 via the communication units 350, 351 and determine that the vehicle 100 is sufficiently close to the base unit 111 to start the positioning process by means of the request signals.

The one or more receiver units 323 of the base unit 111 are configured to receive the request signals and to detect a signal strength of the received request signals and transmit it back to the vehicle 100. The detected signal strengths can be transmitted back to the receiver unit 204 of the vehicle 100 in one or more response signals (as in the case of the keyless access function). Alternatively or additionally, the detected signal strengths can be transmitted to the vehicle 100 via the communication units 351, 350 (e.g. via WLAN).

The control unit 202 of the vehicles 100 is configured to detect the distances between the individual transmitter units 201 of the vehicle 100 and the individual receiver units 323 of the base unit 111 on the basis of the signal strengths of the request signals. The position of the vehicle 100 relative to the base unit 111 and/or the rotation of the vehicle 100 relative to the base unit 111 can then be determined from the distances (e.g. using triangulation methods).

The determination of a precise position of the vehicle 100 therefore requires precise detection of the signal strength of the request signals. As stated above, the inductive charging of the battery 103 of a vehicle 100 is carried out by forming an electromagnetic charging field with a specific charging field frequency by means of the base unit 111. The frequency of the charging field is typically between 80-90 kHz (e.g. 85 kHz) or 145 kHz here. A current is induced in the WPT vehicle unit 102 by means of the charging field in the secondary coil. The induced alternating current is rectified and filtered, with the result that an electrical on board power system of the vehicle 100 can be supplied and/or the vehicle battery 103 can be charged with the resulting direct current.

Therefore, the charging field frequencies for the inductive charging (80 90 kHz or 145 kHz) lie in an adjacent frequency range and/or in the same frequency range as the frequency range which is used for emitting a request signal by the transmitter units 201 (20 140 kHz). In particular, the frequencies for the inductive charging lie in a frequency range which can disrupt the reception of the request signal of the keyless access function. This can lead to a situation in which the signal strength of a request signal cannot be determined with sufficient accuracy, since the electromagnetic field which is received by a receiver unit 223, 323 includes energy components of the electromagnetic charging field.

In order to ensure that the signal strength of a request signal can be determined with sufficient accuracy, signal conditioning can be carried out in the receiver unit 223 of a key 220, by which conditioning frequency components of the request signal are isolated in a preferred way. In particular, the receiver unit 223 of a key 220 can have an analog input filter which is configured to filter out the request signal from an electromagnetic field and to block (or to damp) other frequencies of the electromagnetic field (in particular the charging field frequency range).

The receiver unit 223 of a key 220 is typically tuned to the frequency range of the request signal of a specific vehicle manufacturer. As stated at the beginning, different vehicle manufacturers use different frequency ranges for making available a keyless access function. In contrast to a vehicle key 220, the base unit 111 should be configured to permit positioning of the vehicle 100 in a way which is independent of manufacturers. The receiver unit 323 of a base unit 111 is therefor configured in such a way that request signals can be received in different frequency ranges and can be delimited from the charging field frequency range of the charging field. The signal strength of request signals can therefore be detected in different frequency ranges in a precise and robust fashion.

Figure 4:
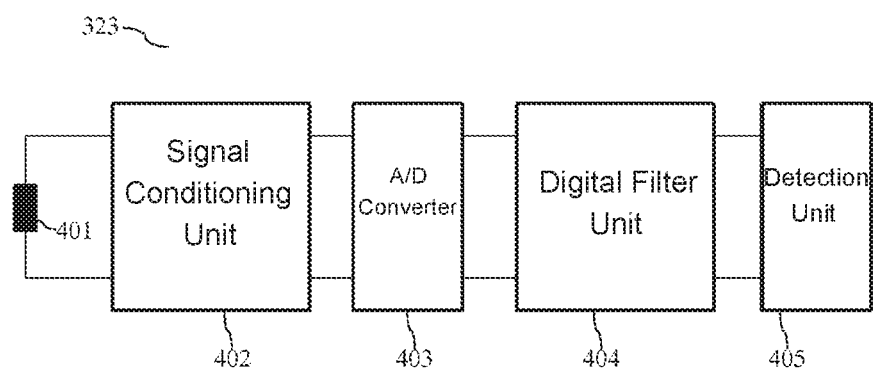
FIG. 4 is a schematic diagram of an exemplary receiver unit for a base unit.

FIG. 4 shows a block diagram of an exemplary receiver unit 323 for a base unit 111. The receiver unit 323 includes a receiver coil 401 which is configured to receive an electromagnetic field (which also includes the request signal) and to convert it into electrical current. The receiver unit 323 also includes a signal conditioning unit 402 which is configured to condition the received analog electrical signal in such a way that a frequency component of the electromagnetic charging field is damped relative to a frequency component of the request signal, in a way which is independent of manufacturers.

The receiver unit 323 can also include an analog-to digital (A/D) converter which is configured to sample the conditioned analog signal and convert it into a digital signal. The sampling frequency which is used here can depend on a modulation frequency or a bandwidth of the request signal. Exemplary sampling frequencies are 290 kHz or more.

Furthermore, the receiver unit 323 can include a digital filter unit 404 which is configured to isolate a specific frequency component of the request signal which is emitted by a specific vehicle 100. A digital filter of the digital filter unit 404 can depend, in particular, on the frequency range in which the transmitter units 201 of the approaching vehicle 100 transmit request signals. The frequency range of the emitted request signals can be transmitted from the vehicle 100 to the base unit 111 (e.g. via the communication units 350, 351).

Furthermore, the receiver unit 323 includes a detection unit 405 which is configured to detect a signal strength of a received request signal on the basis of the filtered digital signal. The detected signal strength can then be transmitted to the vehicle 100.

Figure 5A:
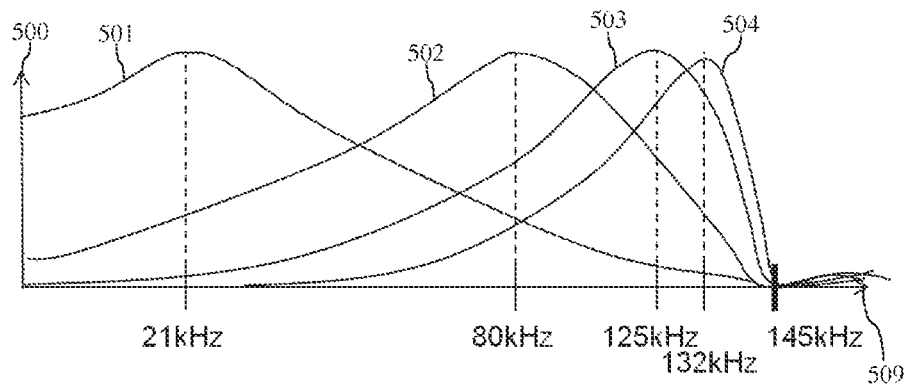
FIG. 5a is a schematic diagram of exemplary transmission functions of the signal conditioning for request signals with different vehicle manufacturers.

FIG. 5a shows exemplary transmission functions 501, 502, 503, 504 of the signal conditioning of received request signals for different frequency ranges, i.e. for different manufacturers. A transmission function 501, 502, 503, 504 represents a component 500 of the adapting signal as a function of the frequency 509. The illustrated transmission functions 501, 502, 503, 504 are each tuned to the frequency range of the keyless access function of a specific manufacturer (with the exemplary frequencies of maximum sensitivity at 21 kHz, 80 kHz, 125 kHz and 132 kHz).

In the illustrated example it is assumed that the electromagnetic charging field has a charging frequency of 145 kHz. The transmission functions 501, 502, 503, 504 have a damping which is as large as possible at the charging frequency in order to keep the influence of the electromagnetic charging field on the detected signal strength of a request signal as small as possible.

The signal conditioning unit 40 of the receiver unit 323 can be configured to receive request signals in a plurality of different frequency ranges. Furthermore, the signal conditioning unit 402 can be configured to damp the charging field frequency range of the electromagnetic charging field relative to the plurality of different frequency ranges of different request signals. For this purpose, the signal conditioning unit 402 can be adapted to the frequency range of a specific request signal (i.e. to the frequency range of a specific manufacturer). As stated above, the control unit 202 of a vehicle 100 can be configured to communicate to the base unit 111 (e.g. via the communication units 350, 351) the frequency range by means of the request signals emitted by the transmitter units 210. The signal conditioning unit 402 of the receiver unit 323 can then be adapted to this frequency range. Alternatively, the signal conditioning unit 402 can be configured in a static fashion.

Figure 5B:
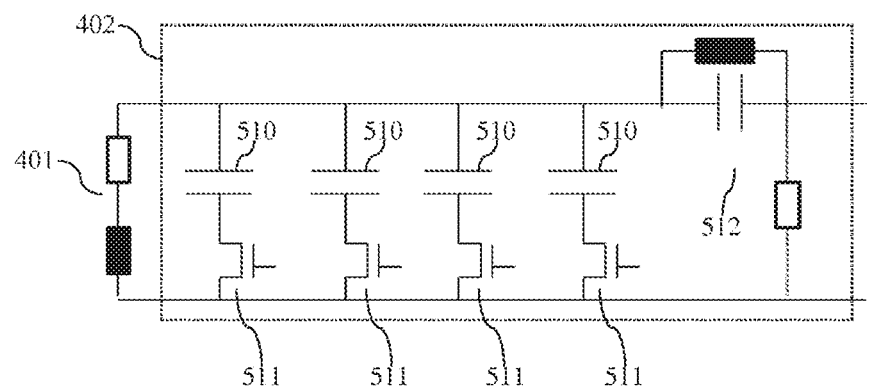
FIG. 5b is an exemplary circuit diagram of an analog signal conditioning unit.

FIG. 5b shows a circuit diagram of an exemplary signal conditioning unit 402 which can be adapted to a plurality of different frequency ranges. In FIG. 5b, the reception coil 401 is represented by an ideal coil and a coil resistance. The signal conditioning unit 402 includes a plurality of capacitors 510 which are connected in parallel and which can be connected in parallel by means of a corresponding plurality of switches 511. By changing the number of capacitors 510 which are connected in parallel it is possible for the receiver circuit (LC circuit) which is composed of the coil 401 and the one or more capacitors 510 to be adapted to different frequency ranges. In this way, the transmission function 501, 502, 503, 504 of the signal conditioning unit 402 can be adapted to the frequency range of the request signals.

The signal conditioning unit 402 can also include a blocking circuit 512 (comprising for example a coil, a capacitor and a resistor) with which the charging field frequency range can be blocked or damped.

Figure 5C:
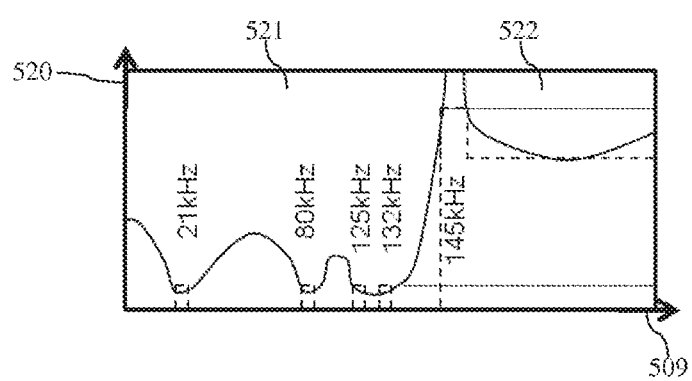
FIG. 5c is a graph of an exemplary damping profile of an analog signal conditioning unit.

FIG. 5c shows an exemplary damping function 520 of a static signal conditioning unit 402. The signal conditioning unit 402 from FIG. 5c is configured in such a way that in a first frequency range 521 relatively low damping is present, in order to permit a received signal to pass through as unimpeded as possible. The first frequency range 521 can be configured in such a way that it includes the plurality of frequency ranges of the request signals of different manufacturers. Furthermore, the signal conditioning unit 402 can be configured in such a way that in a second frequency range 522 there is relatively high damping in order to block a received signal as strongly as possible. The second frequency range 522 can be configured in such a way that it includes the charging field frequency range (145 kHz in the illustrated example). Furthermore, a bandwidth limitation of the analog electrical signal can be carried out by means of the second frequency range 522, and therefore overloading of the following A/D converter 403 can be prevented.

The signal conditioning unit 402 can be, for example, a Cauer filter.

As illustrated in FIG. 4, the receiver unit 323 can also include a digital filter unit 404. A digital filter of the filter unit 404 can be tuned to a specific frequency range of the request signals of a specific manufacturer. The digital filter unit 404 can be configured to detect information relating to the frequency range of the request signals and to adapt a transmission function or damping function of the digital filter to a specific frequency range for request signals. For this purpose, frequency range specific filter parameters can be used (which are stored e.g. in a lookup table). The digital filter can be, for example, an FIR (finite impulse response) filter.

Figure 6:
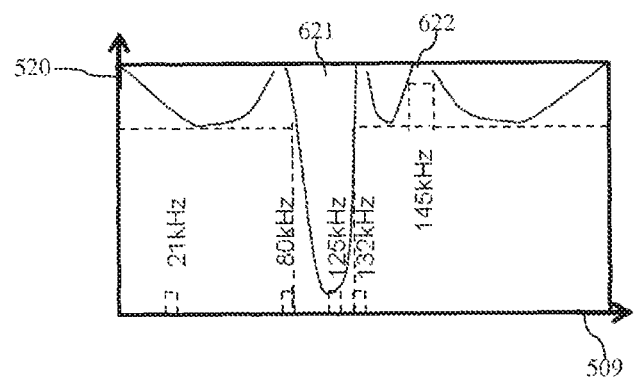
FIG. 6 is a graph of an exemplary damping profile of a digital filter unit.

FIG. 6 shows an exemplary damping function 520 of a digital filter of the filter unit 404. The damping function 520 includes a first frequency range 621 with relatively low damping (relative to the damping in the other frequency ranges). The first frequency range 621 can include the frequency range used by the vehicle 100 for transmitting request signals. The frequency ranges for request signals of other manufacturers can be damped comparatively strongly by the damping function 520 of the digital filter. Furthermore, the damping function 520 can include a second frequency range 622 with particularly high damping. The second frequency range 622 can include the charging field frequency range.

The digital signal at the output of the filter unit 404 therefore includes primarily energy in the first frequency range 621. It can therefore be assumed that the signal strength of the digital signal at the output of the fitter unit 404 corresponds to the signal strength of a received request signal. The receiver unit 323 is therefore configured to detect a precise value for the signal strength of request signals in a way which is independent of the manufacturer. As a result, precise determination of the position/rotation of the vehicle 100 relative to the base unit 111 is made possible.

Figure 7:
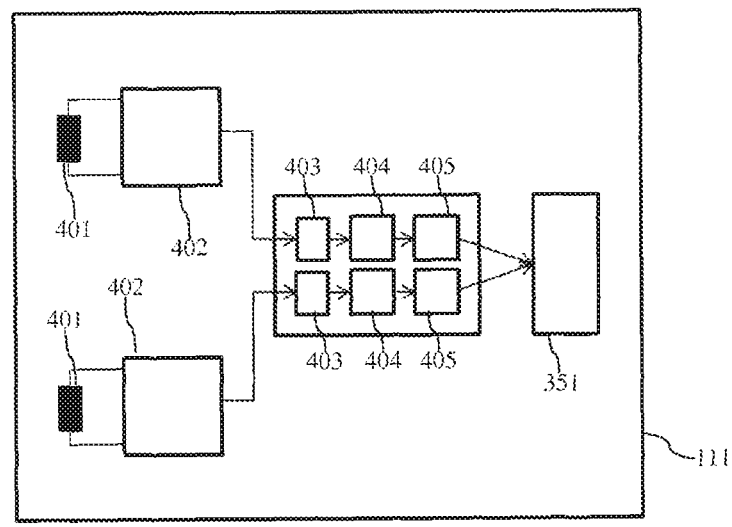
FIG. 7 is a block diagram of an exemplary base unit.

FIG. 7 shows a block diagram of an exemplary base unit 111 with two receiver units 323. In particular, FIG. 7 shows the reception coils 401, the signal conditioning units 402, the A/D converters 403, the digital filter units 404 and the detection units 405 of the two receiver units 323. The detected signal strengths of the request signals can be transmitted to the vehicle 100 via the communication unit 351.

The position/rotation of the vehicle 100 relative to the base unit 111 can then be determined from the detected signal strengths.

As stated above, owing to the relatively high field strength of the electromagnetic charging field, the inductive charging system can disrupt the transmission of a request signal of the same vehicle 100 or of a request signal from an adjacent vehicle 300 (see FIG. 3). For example, a plurality of base units 111, 311 can be arranged next to one another (e.g. in a multistory car park). The electromagnetic charging fields of the plurality of base units 111, 311 and/or the request signals of a corresponding plurality of vehicles 100, 300 can disrupt one another and therefore disrupt a positioning process and/or a keyless access function.

For example, the vehicle 300 illustrated in FIG. 3 can be charged by way of the base unit 311. The base unit 311 can include one or more of the receiver units 323 described in this document. The one or more receiver units 323 of the base unit 311 can be configured to receive a request signal from a transmitter unit 201 of the adjacent vehicle 100. The request signal of the adjacent vehicle 100 can be emitted e.g. in order to detect the position of the vehicle 100 or in order to make available a keyless access function. The request signal of the adjacent vehicle 100 can use a different frequency range here than a request signal of the charging vehicle 300.

In order to receive a request signal from the transmitter unit 201 of the adjacent vehicle 100, the digital filter of the filter unit 404 can be adapted to the frequency ranges of the different vehicle manufacturers. In particular, the different frequency ranges can be set cyclically and signal strengths of the output signals of the filter unit 404 can be detected. An increased signal strength in a frequency range indicates that a request signal has been emitted by a vehicle 100, 300 (and also by an adjacent vehicle 100).

In other words, the base unit 311 can be configured to check, by means of the one or more receiver units 323, whether a request signal has been emitted in a specific frequency range of the plurality of frequency ranges. For this purpose, the filter unit 404 can be adapted in parallel and/or cyclically to the plurality of frequency ranges in order to detect whether and, if appropriate in which frequency range, a request signal has been emitted.

The base unit 311 can be configured temporarily to switch off or reduce the transmission of energy to the vehicle 300, in order to avoid interference during the positioning or during the access function of the adjacent vehicle 100. In particular, the base unit 300 can be configured to reduce (temporarily) the field strength of an electromagnetic charging field generated by the base unit 311, if it has been detected that a request signal of the vehicle 300 to be charged and/or of an adjacent vehicle 100 has been emitted.

In order to ensure that request signals can be received in all possible frequency ranges, the signal conditioning unit 402 of the base unit 311 is preferably configured in a static fashion (e.g. as presented in FIG. 5c). The digital filter of the filter unit 404 can be calculated in parallel for all the known frequency ranges of request signals. In particular, a plurality of parallel filter elements can be used. The number of parallel filter elements can be reduced if the possible frequency ranges are checked at least partially cyclically and sequentially.

When an increased computing power is used, the one or more digital filters of a filter unit 404 can have a small passband width and a higher sensitivity than the receiver unit 223 of a vehicle key 220. This permits immediate reaction of the base unit 311 (e.g. by reducing the field strength of the charging field) if a request signal has been emitted by an adjacent vehicle 100. When a plurality of parallel digital filters are used to cover the plurality of frequency ranges, the computational expenditure for the individual digital filters can also be reduced, since a number of filter functions, e.g. the cutoff range in the upper frequency range and/or the cutoff range 622 for the charging field frequency range are identical for all the digital filters.

In this document, a base unit been described which permits vehicles to be assisted in a fashion which is independent of the manufacturer during the positioning over the base unit. In this context, it is possible to use components which are already present in the vehicle, as a result of which a cost effective positioning solution is made possible. Furthermore, the robustness of the positioning of the vehicle can be increased by suitable measures for reducing the influence of an electromagnetic charging field.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A charging station for wirelessly transmitting electrical energy to a vehicle, the charging station comprising:
    a base unit which is configured to generate an electromagnetic charging field for transmitting electrical energy to the vehicle; and
    a receiver unit which is configured
        to receive a request signal from a transmitter unit of a vehicle;
    wherein the request signal lies in any of a plurality of different frequency ranges;
        to detect a signal strength of the received request signal;
        to detect the frequency range of the request signal from the plurality of different frequency ranges; and
        to adapt a signal conditioning unit to the frequency range of the request signal,
    wherein a position of the vehicle relative to the base unit is determined based on the detected signal strength of the received request signal, and
    wherein the request signal comprises a request signal of a keyless access function and/or of a keyless engine start function of the vehicle.

2. The charging station as claimed in claim 1, wherein the receiver unit comprises:
    a receiver coil which is configured to convert an electromagnet field into an analog electrical signal,
    wherein the signal conditioning unit is configured to damp the analog electrical signal in a charging field frequency range of the electromagnetic charging field relative to the analog electrical signal in one or more of the plurality of different frequency ranges.

3. The charging station as claimed in claim 2, wherein the receiver unit is configured
    to damp the analog electrical signal in the charging field frequency range relative to the analog electrical signal in all of the plurality of different frequency ranges; and
    to damp the analog electrical signal in the plurality of different frequency ranges with a predefined damping or less.

4. The charging station as claimed in claim 3, wherein the receiver unit comprises:
    an analog to digital converter which is configured to convert a signal derived from the analog electrical signal into a digital signal; and a filter unit which is configured to raise the digital signal in one of the plurality of different frequency ranges relative to the digital signal into the other of the plurality of different frequency ranges; and a detection unit which is configured to detect a signal strength of a signal at the output of the filter unit.

5. The charging station as claimed in claim 4, wherein:

the filter unit comprises a digital filter; and the digital filter is sequentially adaptable to the plurality of different frequency ranges.

6. The charging station as claimed in claim 5, wherein the plurality of different frequency ranges comprises at least two of the following frequency ranges:

a frequency range around 21 kHz;
a frequency range around 80 kHz;
a frequency range around 125 kHz; and
a frequency range around 132 kHz.

7. The charging station as claimed in claim 2, wherein the receiver unit comprises:

an analog to digital converter which is configured to convert a signal derived from the analog electrical signal into a digital signal; and a filter unit which is configured to raise the digital signal in one of the plurality of different frequency ranges relative to the digital signal into the other of the plurality of different frequency ranges; and a detection unit which is configured to detect a signal strength of a signal at the output of the filter unit.

8. The charging station as claimed in claim 1, wherein the receiver unit comprises:

an analog to digital converter which is configured to convert a signal derived from the analog electrical signal into a digital signal; and a filter unit which is configured to raise the digital signal in one of the plurality of different frequency ranges relative to the digital signal into the other of the plurality of different frequency ranges; and a detection unit which is configured to detect a signal strength of a signal at the output of the filter unit.

9. The charging station as claimed in claim 1, wherein the plurality of different frequency ranges comprises at least two of the following frequency ranges:

a frequency range around 21 kHz;
a frequency range around 80 kHz;
a frequency range around 125 kHz; and
a frequency range around 132 kHz.

10. The charging station as claimed in claim 1, wherein:

the request signal is transmitted by the transmitter unit of the vehicle to which electrical energy is to be transmitted via the base unit.

11. The charging station as claimed in claim 1, wherein the charging station is configured to cause the base unit to reduce a field strength of the electromagnetic charging field if the reception of a request signal has been detected by the receiver unit.

12. A method for determining a position of a vehicle relative to a charging station, the method comprising the acts of:

receiving a signal at the charging station, wherein the received signal comprises a request signal transmitted from the vehicle, and wherein the request signal lies in any of a plurality of different frequency ranges;

detecting a frequency range of the request signal at the charging station as a frequency range from the plurality of different frequency ranges;

conditioning the received signal as a function of the detected frequency range of the request signal;

detecting a signal strength of the request signal on the basis of the conditioned signal; and detecting the position of the vehicle relative to the charging station on the basis of the detected signal strength, wherein the request signal comprises a request signal of a keyless access function and/or of a keyless engine start function of the vehicle.

\* \* \* \* \*